United States Patent
Tseng et al.

(10) Patent No.: US 11,226,468 B2
(45) Date of Patent: Jan. 18, 2022

(54) LENS DRIVING APPARATUS, PHOTOGRAPHING MODULE AND ELECTRONIC DEVICE

(71) Applicant: LARGAN DIGITAL CO., LTD., Taichung (TW)

(72) Inventors: Te-Sheng Tseng, Taichung (TW); Wen-Hung Hsu, Taichung (TW); Ming-Ta Chou, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 180 days.

(21) Appl. No.: 15/957,015

(22) Filed: Apr. 19, 2018

(65) Prior Publication Data

US 2019/0129130 A1 May 2, 2019

(30) Foreign Application Priority Data

Nov. 2, 2017 (TW) .................................. 106137981

(51) Int. Cl.
*G02B 7/09* (2021.01)
*G02B 7/08* (2021.01)

(52) U.S. Cl.
CPC ........ *G02B 7/09* (2013.01); *G02B 7/08* (2013.01)

(58) Field of Classification Search
CPC .................................. G02B 7/08; G02B 7/09
USPC .......................................................... 359/824
See application file for complete search history.

(56) References Cited

U.S. PATENT DOCUMENTS

| | | | |
|---|---|---|---|
| 5,570,191 A * | 10/1996 | Uesugi | G01J 3/02 250/226 |
| 9,360,653 B2 | 6/2016 | Lee et al. | |
| 9,547,216 B2 | 1/2017 | Jung et al. | |
| 9,575,285 B2 | 2/2017 | Dong et al. | |
| 9,690,070 B2 | 6/2017 | Lee et al. | |
| 9,696,515 B2 | 7/2017 | Hsu | |
| 10,162,150 B2 | 12/2018 | Lu et al. | |
| 2012/0250156 A1 * | 10/2012 | Asakawa | H02K 41/031 359/554 |

(Continued)

FOREIGN PATENT DOCUMENTS

| CN | 1821825 A | 8/2006 |
|---|---|---|
| CN | 204101866 U | 1/2015 |

(Continued)

*Primary Examiner* — Marin Pichler
*Assistant Examiner* — Mitchell T Oestreich
(74) *Attorney, Agent, or Firm* — McClure, Qualey & Rodack, LLP (57) ABSTRACT

A lens driving apparatus is for driving a lens assembly and includes a holder, a metal cover, a carrier, at least one detection magnet, a circuit board, at least one position detection unit, a coil and at least three driving magnets. The holder has a rectangular appearance, wherein the holder includes a holder opening and four sides. The carrier is displaceable relative to the holder along a direction parallel to a central axis. The holder further includes at least three first terminals and a plurality of second terminals. The first terminals are positioned close to only one of the four sides of the holder and extended outward from the holder along the direction parallel to the central axis, wherein the position detection unit is positioned close to another one of the four sides. The second terminals are fixedly connected to the circuit board.

14 Claims, 12 Drawing Sheets

(56) References Cited

U.S. PATENT DOCUMENTS

2019/0041661 A1* 2/2019 Murakami ............. H04N 5/232

FOREIGN PATENT DOCUMENTS

| CN | 105048765 A | 11/2015 |
| --- | --- | --- |
| CN | 205195531 U | 4/2016 |
| TW | 201403160 A | 1/2014 |
| WO | 2017138041 A1 | 8/2017 |

* cited by examiner

LENS DRIVING APPARATUS, PHOTOGRAPHING MODULE AND ELECTRONIC DEVICE

RELATED APPLICATIONS

This application claims priority to Taiwan Application Ser. No. 106137981, filed Nov. 2, 2017, which is herein incorporated by reference.

BACKGROUND

Technical Field

The present disclosure relates to a lens driving apparatus and a photographing module. More particularly, the present disclosure relates to a lens driving apparatus and a photographing module which are applicable to portable electronic devices.

Description of Related Art

In general, the voice coil motor (VCM) acting as a lens driving apparatus is applied to the lens assembly in the electronic device for providing an auto-focusing function, and at least one leaf spring of the lens driving apparatus is assembled on the carrier. When the leaf spring is deformed by force to provide degrees of freedom and restoring force for the carrier, the lens assembly can be carried to be displaced by the carrier so as to achieve the auto-focusing function.

However, this kind of lens driving apparatus usually includes quite numerous parts. In order to meet the demands of accurate and smooth displacement of the lens assembly, it is required lots of alignment and calibration steps during the assembling procedure of the lens driving apparatus so as to finish accurately assembling the lens driving apparatus from the parts one by one. Thus, it limits the production efficiency and the manufacturing yield rate of the lens driving apparatus.

Given the above, how to improve the production efficiency while maintaining the assembling accuracy, enhance the image quality of the photographing module, and thereby satisfy the requirements of the electronic devices in high-end imaging has become one of the important subjects related to a lens driving apparatus.

SUMMARY

According to one aspect of the present disclosure, a lens driving apparatus is for driving a lens assembly and includes a holder, a metal cover, a carrier, at least one detection magnet, a circuit board, at least one position detection unit, a coil and at least three driving magnets. The holder has a rectangular appearance, wherein the holder includes a holder opening and four sides. The metal cover couples to the holder and includes a cover opening, which is disposed correspondingly to the holder opening. The carrier has a central axis, wherein the carrier is for being assembled with the lens assembly, the carrier is disposed in the metal cover, and the carrier is displaceable relative to the holder along a direction parallel to the central axis. The detection magnet couples to an end of the carrier, wherein the end of the carrier is close to the holder. The circuit board includes a circuit board opening, which is disposed correspondingly to the holder opening. The position detection unit is disposed on the circuit board and correspondingly to the detection magnet, wherein the position detection unit is for detecting a displacement along the direction parallel to the central axis of the detection magnet. The coil is wound around and disposed on an outer surface of the carrier. The driving magnets are disposed in the metal cover and correspondingly to the coil. The holder further includes at least three first terminals and a plurality of second terminals. The first terminals are positioned close to only one of the four sides of the holder and extended outward from the holder along the direction parallel to the central axis, wherein the position detection unit is positioned close to another one of the four sides. The second terminals are fixedly connected to the circuit board.

According to another aspect of the present disclosure, a photographing module includes the lens driving apparatus according to the foregoing aspect and the lens assembly. The lens assembly is assembled with the carrier of the lens driving apparatus.

According to another aspect of the present disclosure, an electronic device includes the photographing module according to the foregoing aspect and an image sensor. The image sensor is for receiving an imaging light from the lens assembly.

DETAILED DESCRIPTION

1st Embodiment

Figure 1:
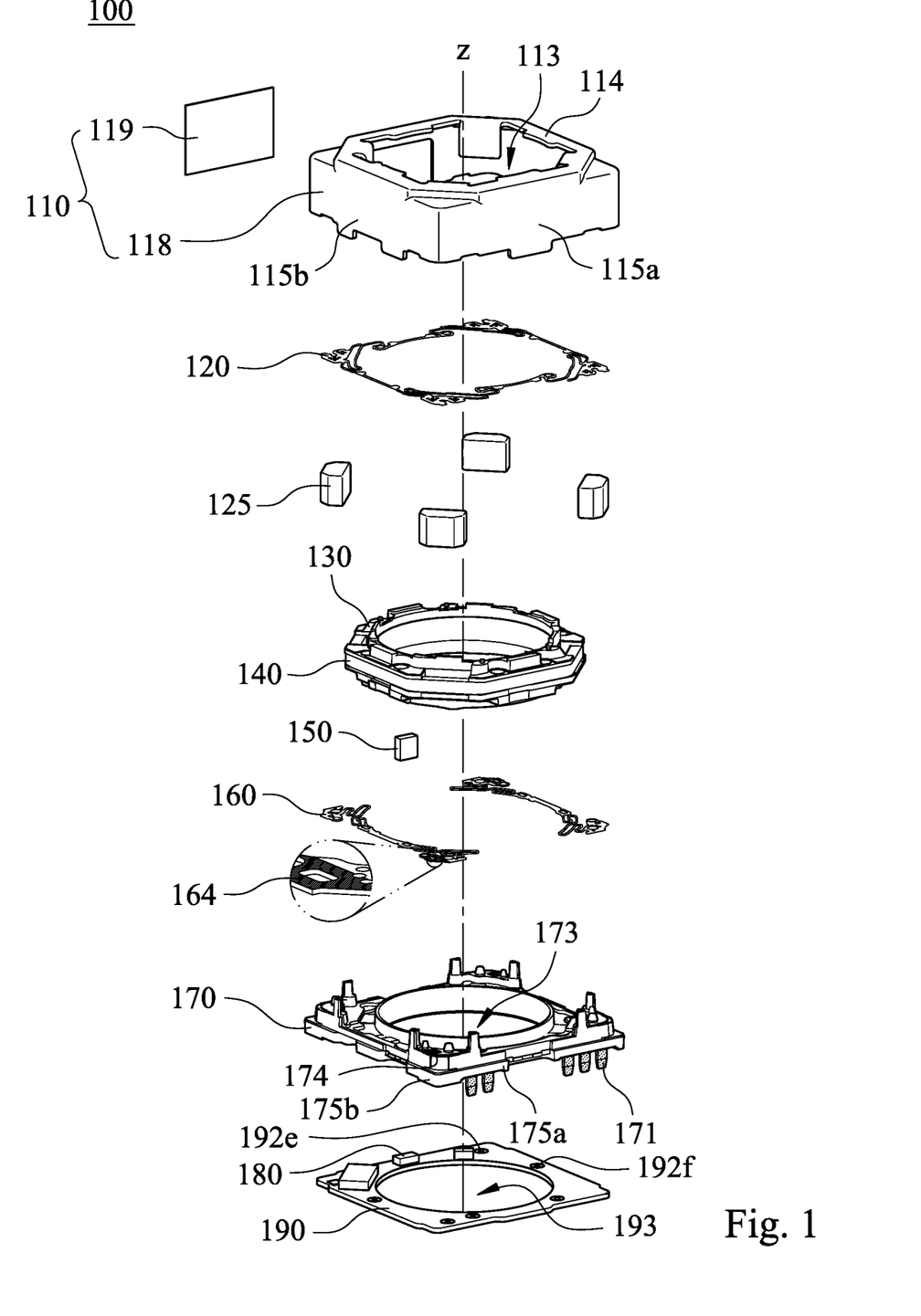
FIG. 1 is an exploded view of a lens driving apparatus according to the 1st embodiment of the present disclosure.
Figure 2:
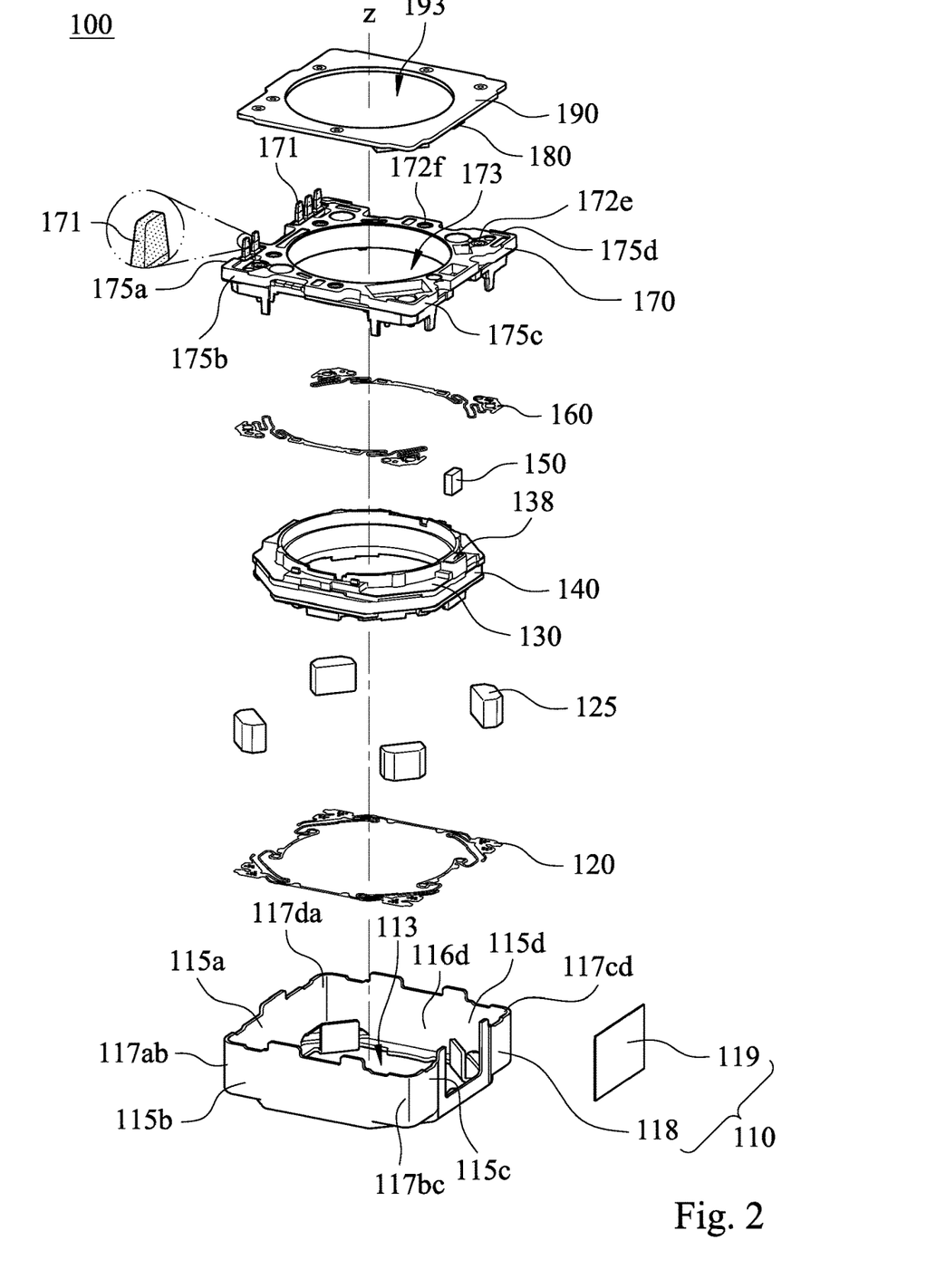
FIG. 2 is another exploded view of the lens driving apparatus according to the 1st embodiment.
Figure 3:
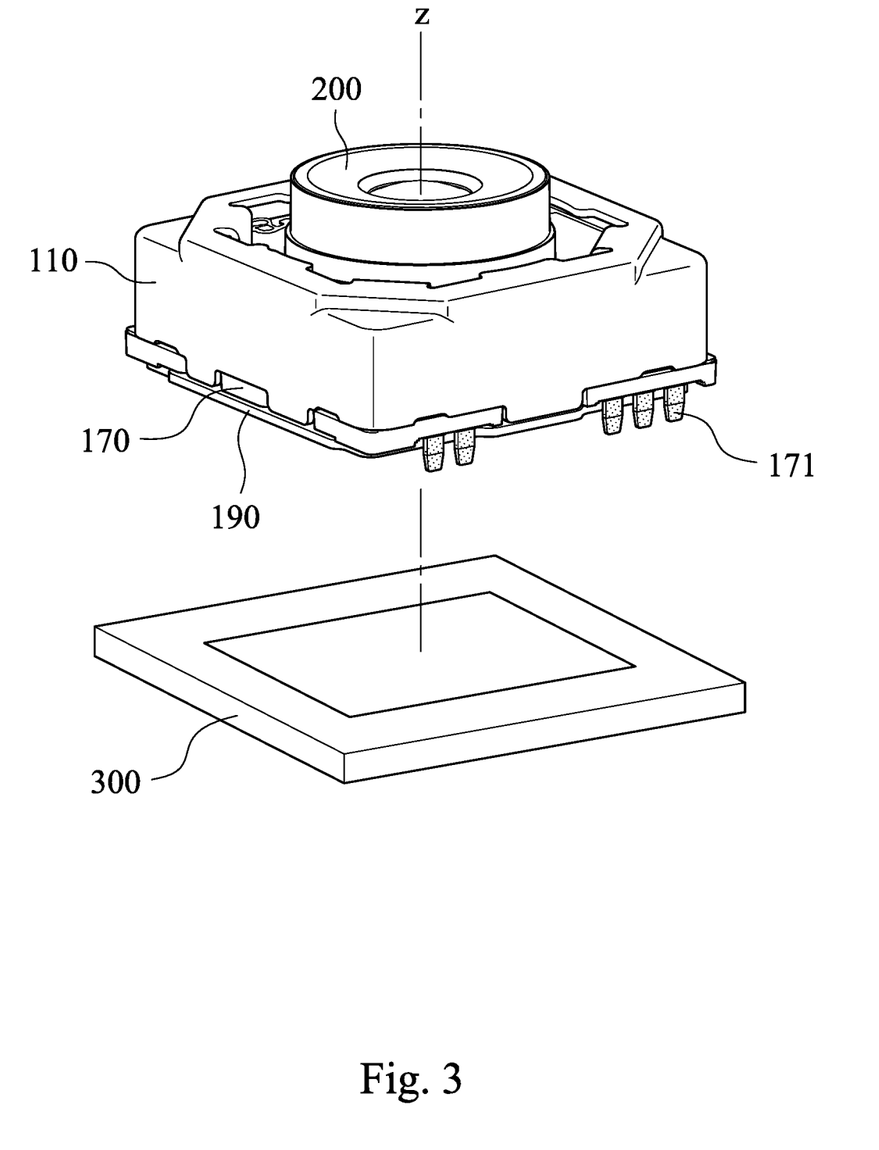
FIG. 3 is a schematic view of the lens driving apparatus according to the 1st embodiment, a lens assembly and an image sensor.

FIG. 1 is an exploded view of a lens driving apparatus 100 according to the 1st embodiment of the present disclosure, FIG. 2 is another exploded view of the lens driving apparatus 100 according to the 1st embodiment, and FIG. 3 is a schematic view of the lens driving apparatus 100 according to the 1st embodiment, a lens assembly 200 and an image sensor 300. In FIG. 1 to FIG. 3, the lens driving apparatus 100 is for driving the lens assembly 200 and includes a holder 170, a metal cover 110, a carrier 130, at least one detection magnet 150, a circuit board 190, at least one position detection unit 180, a coil 140 and at least three driving magnets 125.

In FIG. 3, the lens assembly 200 is assembled with the lens driving apparatus 100. The image sensor 300 is for receiving an imaging light from the lens assembly 200 and disposed on a circuit board (not shown herein), which carries the image sensor 300. For clearly describing the characteristics, FIG. 3 shows that the image sensor 300 has not been assembled with the lens assembly 200 and the lens driving apparatus 100 yet.

In FIG. 1 and FIG. 2, the holder 170 has a rectangular appearance. That is, the holder 170 is mainly square or rectangular in appearance. The holder 170 includes a holder opening 173 and four sides 175a, 175b, 175c, 175d. Moreover, the four sides 175a, 175b, 175c, 175d are connected to form the rectangular appearance of the holder 170. The metal cover 110 couples to the holder 170, that is, the metal cover 110 is disposed correspondingly to the holder 170, and thereby an accommodating space is formed. The metal cover 110 includes a cover opening 113, wherein the cover opening 113 is disposed correspondingly to the holder opening 173. Furthermore, the metal cover 110 may be made of a metal material overall, or made of a metal material with just a part thereof, such as being processed with a metal coating or a metal painting on a surface of a nonmetal material.

The carrier 130 has a central axis z (i.e. an optical axis of the lens assembly 200), wherein the carrier 130 is for being assembled with the lens assembly 200. The carrier 130 is disposed in the metal cover 110, and the carrier 130 is displaceable relative to the holder 170 along a direction parallel to the central axis z. That is, the lens assembly 200 assembled on the carrier 130 is displaceable relative to the holder 170 along the direction parallel to the central axis z. The coil 140 is wound around and disposed on an outer surface (its reference numeral is omitted) of the carrier 130. The driving magnets 125 are disposed in the metal cover 110 and correspondingly to the coil 140. In the 1st embodiment, a number of the driving magnets 125 is four.

The circuit board 190 includes a circuit board opening 193, which is disposed correspondingly to the holder opening 173. That is, the central axis z passes through the cover opening 113, the holder opening 173 and the circuit board opening 193, and the cover opening 113, the holder opening 173 and the circuit board opening 193 are corresponding to each other. Furthermore, the circuit board 190 may be a printed circuit board (PCB), a flexible printed circuit board (FPC), or other type of circuit board configured to circuit routing and components placement.

The detection magnet 150 couples to an end (its reference numeral is omitted) of the carrier 130, wherein the end of the carrier 130 is close to the holder 170. The position detection unit 180 is disposed on the circuit board 190 and correspondingly to the detection magnet 150, wherein the position detection unit 180 is for detecting a displacement along the direction parallel to the central axis z of the detection magnet 150. The detection magnet 150 and the lens assembly 200 are both assembled on the carrier 130, thereby a displacement along the direction parallel to the central axis z of the lens assembly 200 can be obtained from the displacement along the direction parallel to the central axis z of the detection magnet 150 detected by the position detection unit 180. The position detection unit 180 is disposed correspondingly to the detection magnet 150, thereby the lens assembly 200 is allowed to directly move to a focusing position every time, and there is no need to move the lens assembly 200 to an original position before moving to the focusing position so as to reduce the focusing time.

In the 1st embodiment, a number of the detection magnet 150 is one, and a number of the position detection unit 180 is one. The detection magnet 150 has a shape, which is corresponding to the carrier 130, to couple to the carrier 130. Specifically, the detection magnet 150 is assembled on the carrier 130 in an upright type, that is, a length along the direction parallel to the central axis z of the detection magnet 150 is greater than a length along any direction vertical to the central axis z of the detection magnet 150. In other embodiments according to the present disclosure (not shown in drawings), a number of the detection magnets may be at least two, a number of the position detection units may be at least two, and the number of the detection magnets and the number of the position detection units may not be the same. Based on the design or production requirements of the lens driving apparatus, the number of the detection magnet may be adjustable. For example, another detection magnet or a compensation element may be allocated on a symmetrical position with respect to a central axis, wherein the compensation element may be without a magnetic property but have the same or a corresponding weight with the detection magnet.

Figure 4:
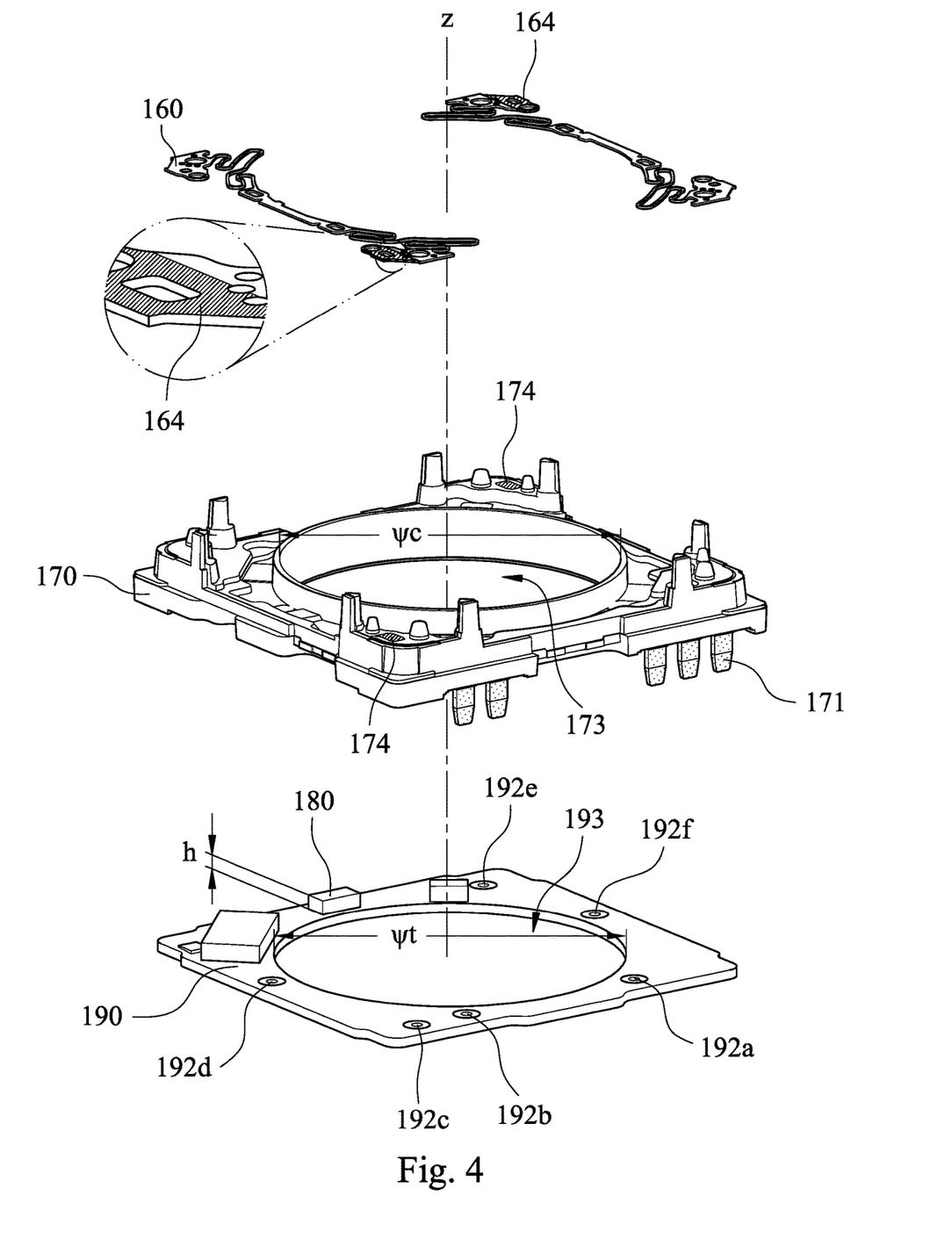
FIG. 4 is a schematic view of a lower leaf spring, a holder and a circuit board according to FIG. 1.
Figure 5:
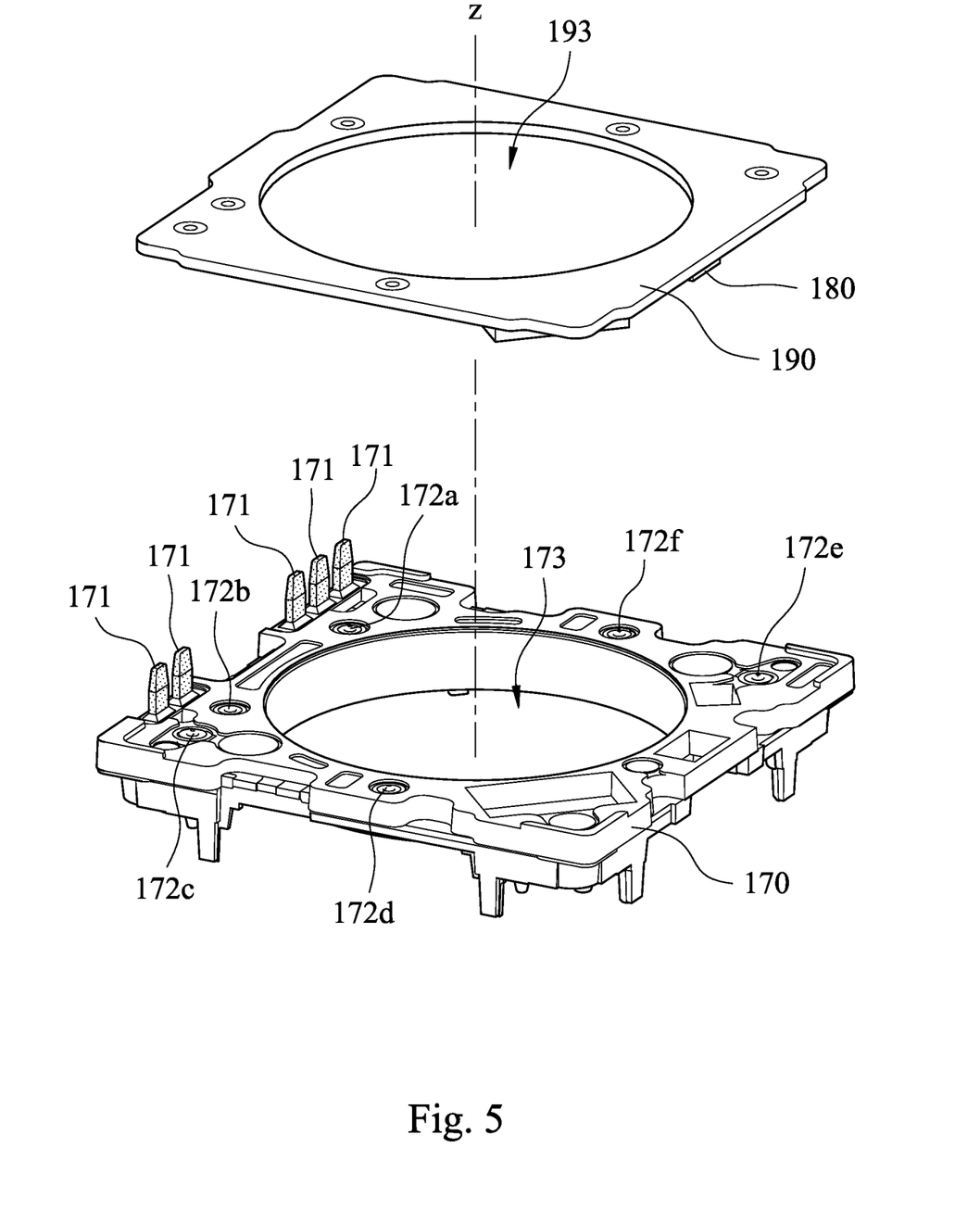
FIG. 5 is a schematic view of the circuit board and the holder according to FIG. 2.

FIG. 4 is a schematic view of a lower leaf spring 160, the holder 170 and the circuit board 190 according to FIG. 1, and FIG. 5 is a schematic view of the circuit board 190 and the holder 170 according to FIG. 2. In FIG. 4 and FIG. 5, the holder 170 further includes at least three first terminals 171 and second terminals 172a, 172b, 172c, 172d, 172e, 172f, wherein the first terminals 171 and the second terminals 172a, 172b, 172c, 172d, 172e, 172f are all made of metal materials.

The second terminals 172a, 172b, 172c, 172d, 172e, 172f are all fixedly connected to the circuit board 190, wherein the second terminals 172a, 172b, 172c, 172d, 172e, 172f may be fixedly connected to the circuit board 190 by manners of welding, soldering, hot stamping and so on.

In FIG. 1 and FIG. 2, the first terminals 171 are positioned close to only one of the four sides 175a, 175b, 175c, 175d of the holder 170 (In the 1st embodiment, the first terminals 171 are positioned close to the side 175a only) and extended outward from the holder 170 along the direction parallel to the central axis z, wherein the position detection unit 180 is positioned close to another one of the four sides 175a, 175b, 175c, 175d (In the 1st embodiment, the position detection unit 180 is positioned close to the side 175c). Therefore, the circuit board opening 193 and the holder opening 173 of the lens driving apparatus 100 are disposed correspondingly to each other, the position detection unit 180 is disposed on the circuit board 190 and correspondingly to the detection magnet 150, and thereby it is favorable for reducing the assembling complexity and increasing the manufacturing yield rate by the components configuration of the lens driving apparatus 100.

Furthermore, in FIG. 1 to FIG. 3, the first terminals 171 are extended outward from the holder 170 along the direction parallel to the central axis z, that is, each of the first terminals 171 is extended at least one of being far from the cover opening 113 and being close to the cover opening 113. An outward extending section (its reference numeral is omitted) of each of the first terminals 171 may have at least one of a straight strip shape, a curved shape, an arc shape and a hemispherical shape. The outward extending section of each of the first terminals 171 may be directly electrically connected to other parts of the lens driving apparatus 100, and may be directly electrically connected to the circuit board carrying the image sensor 300.

Furthermore, in FIG. 4 and FIG. 5, the holder 170 includes a plastic portion and a metal portion, wherein the metal portion includes the first terminals 171 and the second terminals 172a, 172b, 172c, 172d, 172e, 172f, which are all exposed for being externally electrically connected to parts other than the holder 170, and the metal portion also includes a plurality of metal wires (not shown herein), which may be exposed on or embedded in the holder 170. The metal wires of the holder 170 are electrically connected to at least one as needed of the first terminals 171 and the second terminals 172a, 172b, 172c, 172d, 172e, 172f, and the metal wires are not limited in shapes, dimensions, locations and configurations. Moreover, each of the holder 170, the circuit board 190 and the circuit board carrying the image sensor 300 includes metal wires and terminals for externally electrically connecting, and thereby the circuit routing required by the lens driving apparatus 100 could be implemented by the electrical connection among the holder 170 and the circuit board 190 of the lens driving apparatus 100 and the circuit board carrying the image sensor 300. Therefore, it is favorable for increasing the circuit routing flexibility of the lens driving apparatus 100 so as to effectively reduce the routing length, maintain the signal integrity and achieve the fast focusing function. In addition, the first terminals 171 are positioned close to only one of the four sides 175a, 175b, 175c, 175d of the holder 170, the position detection unit 180 is positioned close to another one of the four sides 175a, 175b, 175c, 175d, and it is advantageous in reducing the signal interference in the lens driving apparatus 100 and maintaining the manufacturing convenience.

In the 1st embodiment, a number of the first terminals 171 is five, and the first terminals 171 are positioned close to the side 175a of the holder 170. The second terminals 172a, 172b, 172c, 172d, 172e, 172f of the holder 170 are directly electrically connected to the circuit board 190. The circuit board 190 does not directly contact the circuit board carrying the image sensor 300. The first terminals 171 of the holder 170 are directly electrically connected to the circuit board carrying the image sensor 300. The first terminal 171 does not contact the circuit board 190.

The first terminals 171 may be embedded in or joined with the holder 170 by an insert molding method. Therefore, it is favorable for improving the assembling tolerances of the first terminals 171 assembled in the holder 170 by controlling the accuracies of the molding equipment.

Each of the first terminals 171 may be gold-plated. Therefore, it is favorable for reducing the noise problems of the electronic signal transmission.

In FIG. 4 and FIG. 5, the circuit board 190 may further include conductive joints 192a, 192b, 192c, 192d, 192e, 192f, and the second terminals 172a, 172b, 172c, 172d, 172e, 172f of the holder 170 are respectively corresponding to and welded to the conductive joints 192a, 192b, 192c, 192d, 192e, 192f. That is, the second terminals 172a, 172b, 172c, 172d, 172e, 172f are fixedly connected to the circuit board 190 by welding. Therefore, fixedly connecting by welding is advantageous in enhancing an overall stability and strength of the lens driving apparatus 100.

At least two of the conductive joints 192a, 192b, 192c, 192d, 192e, 192f may be disposed adjacent to and around the circuit board opening 193. Therefore, it is favorable for enhancing the attachment between the circuit board 190 and the holder 170 to avoid the defects of the warped appearance thereof. In the 1st embodiment, four conductive joints 192a, 192b, 192d and 192f are disposed adjacent to and around the circuit board opening 193.

Furthermore, any one of the conductive joints 192a, 192b, 192c, 192d, 192e, 192f may be featured with an electrically connecting function and may be a pad, a through hole pad or a blind hole pad specifically. At least one of the conductive joints 192a, 192b, 192c, 192d, 192e, 192f could be directly electrically connected to other part of the lens driving apparatus 100 (in the 1st embodiment, being directly electrically connected to the holder 170). The proper configurations of the conductive joints 192a, 192b, 192c, 192d, 192e, 192f are advantageous in meeting the circuit routing requirements of the lens driving apparatus 100 and achieving well assembling attachment between parts. In the 1st embodiment, the conductive joints 192a, 192b, 192c, 192d, 192e, 192f are through holes featured with the electrically connecting function specifically.

The circuit board 190 may be rectangular and corresponding to the rectangular appearance of the holder 170. Therefore, it is favorable for the attachment between the circuit board 190 and the holder 170 so as to reduce the warpage thereof.

In FIG. 1 and FIG. 2, the lens driving apparatus 100 may further include at least one upper leaf spring 120 and at least one lower leaf spring 160. The upper leaf spring 120 and the lower leaf spring 160 are both connected to the carrier 130 and arranged along the direction parallel to the central axis z. The lower leaf spring 160 is disposed on the end of the carrier 130 close to the holder 170, and the upper leaf spring 120 is disposed on the other end (its reference numeral is omitted) of the carrier 130 far from the holder 170. Thus, the carrier 130 and the lens assembly 200 are carried to be displaced along the direction parallel to the central axis z, that is, the upper leaf spring 120 and the lower leaf spring 160 provide the carrier 130 and the lens assembly 200 with a degree of freedom along the direction parallel to the central axis z. In the 1st embodiment, a number of the upper leaf spring 120 is one, a number of the lower leaf spring 160 is two, and the upper leaf spring 120 and the lower leaf springs 160 are all made of metal materials. In addition, the upper leaf spring and the lower leaf spring herein are the idiomatic expressions in the art, wherein the upper leaf spring indicates a leaf spring, which is far from the holder (i.e. close to an object side of a lens assembly), the lower leaf spring indicates another leaf spring, which is close to the holder (i.e. close to an image side of the lens assembly), and the upper leaf spring and the lower leaf spring do not indicate being disposed at an absolutely upper position and an absolutely lower position respectively.

In FIG. 1 and FIG. 4, each of the lower leaf springs 160 includes a terminal connecting section 164, the holder 170 further includes two metal joints 174, and the terminal connecting sections 164 are directly electrically connected to the metal joints 174 of the holder 170. Therefore, it is favorable for effectively reducing the circuit routing complexity of the lens driving apparatus 100, so that a conductive path accommodating an external driving current for the coil 140 could be fabricated during assembling the lower leaf springs 160 and the holder 170. In the 1st embodiment, each of the two lower leaf springs 160 includes one terminal connecting section 164, a number of the metal joints 174 is two, and each of the terminal connecting sections 164 is connected to a corresponding one of the metal joints 174. Accordingly, current in the coil 140 could be induced by the external driving current, wherein the conductive path of the external driving current is formed by the directly electrical connection between the terminal connecting sections 164 and the metal joints 174, and the directly electrical connection between the first terminals 171 and the circuit board carrying the image sensor 300.

Specifically, a central section (its reference numeral is omitted) of each of the lower leaf springs 160 is connected to the carrier 130, and the terminal connecting section 164 located on one end of each of the lower leaf springs 160 is connected to the corresponding one of the metal joints 174 of the holder 170. Accordingly, the carrier 130 and the lens assembly 200 could be carried to be displaced relative to the holder 170 along the direction parallel to the central axis z by the lower leaf springs 160.

In FIG. 1 and FIG. 2, the metal cover 110 may further include an upper end wall 114 and four side walls 115a, 115b, 115c, 115d. The upper end wall 114 surrounds the cover opening 113. The side walls 115a, 115b, 115c, 115d are connected to the upper end wall 114 and extended from the upper end wall 114 toward the holder 170. The side walls 115a, 115b, 115c, 115d are respectively corresponding to the four sides 175a, 175b, 175c, 175d of the holder 170. The side walls 115a, 115b, 115c, 115d are connected to form corners 117ab, 117bc, 117cd, 117da, wherein the four driving magnets 125 are respectively received in the corners 117ab, 117bc, 117cd, 117da, and a central portion of each of the side walls 115a, 115b, 115c, 115d is not in contact with the driving magnets 125. For example in FIG. 2, the central portion 116d of the side wall 115d is not in contact with the driving magnets 125. Therefore, additional plastic parts for fixing the driving magnets 125 could be omitted so as to reduce the cost. In other embodiments according to the present disclosure (not shown in drawings), the metal cover may further include an upper end wall and at least three side walls, wherein the upper end wall surrounds the cover opening, the side walls are connected to the upper end wall and extended from the upper end wall toward the holder, the side walls are respectively corresponding to at least three of the four sides of the holder, the side walls are connected to form at least two corners, at least two of the driving magnets are respectively received in the corners, and a central portion of each of the side walls is not in contact with the driving magnets.

In the 1st embodiment, the metal cover 110 includes a cover body 118 and an attached piece 119. The cover body 118 includes the upper end wall 114, the side walls 115a, 115b, 115d and a part of the side wall 115c. The attached piece 119 is the other part of the side wall 115c. The cover body 118 and the attached piece 119 are assembled to form the metal cover 110.

In FIG. 4, when a diameter of the circuit board opening 193 is $\psi t$, and a diameter of the holder opening 173 is $\psi c$, the following condition may be satisfied: $\psi t > \psi c$. Therefore, it is favorable for preventing the stray light reflection, which is unwanted, so as to reduce the factors related to worsening the image quality.

In FIG. 1 and FIG. 2, the circuit board 190 may be located adjacent to and connected to an end (its reference numeral is omitted) of the holder 170, wherein the end of the holder 170 is far from the metal cover 110. That is, the circuit board 190 is farther from the metal cover 110 than the holder 170 from the metal cover 110. Therefore, the circuit board 190 adjacent to the end far from the metal cover 110 is advantageous in not affecting the assembling procedure of the entirety of the lens driving apparatus 100. The circuit board 190 would be allowed to be assembled in the last steps of the assembling procedure, and thereby the circuit board 190 could be prevented from affecting the flatness of the holder 170 and the metal cover 110 being assembled. More specifically, the position detection unit 180 and some parts (their reference numerals are omitted) are welded to an end surface of the circuit board 190, wherein the end surface of the circuit board 190 is close to the holder 170. In other embodiments according to the present disclosure (not shown in drawings), the circuit board may not be connected to the end far from the metal cover of the holder, and the circuit board may not be connected to the other end close to the metal cover of the holder, wherein the circuit board opening is disposed correspondingly to the holder opening, the position detection unit is disposed on the circuit board and correspondingly to the detection magnet, and the second terminals of the holder are all fixedly connected to the circuit board.

In FIG. 4, when a thickness of the position detection unit 180 is h, which is a length along the direction parallel to the central axis z of the position detection unit 180, the following condition may be satisfied: h<1.0 mm. Therefore, it is favorable for maintaining the compact size of the lens driving apparatus 100 and the detecting sensitivity of the position detection unit 180, which detects the displacement of the detection magnet 150.

Figure 6:
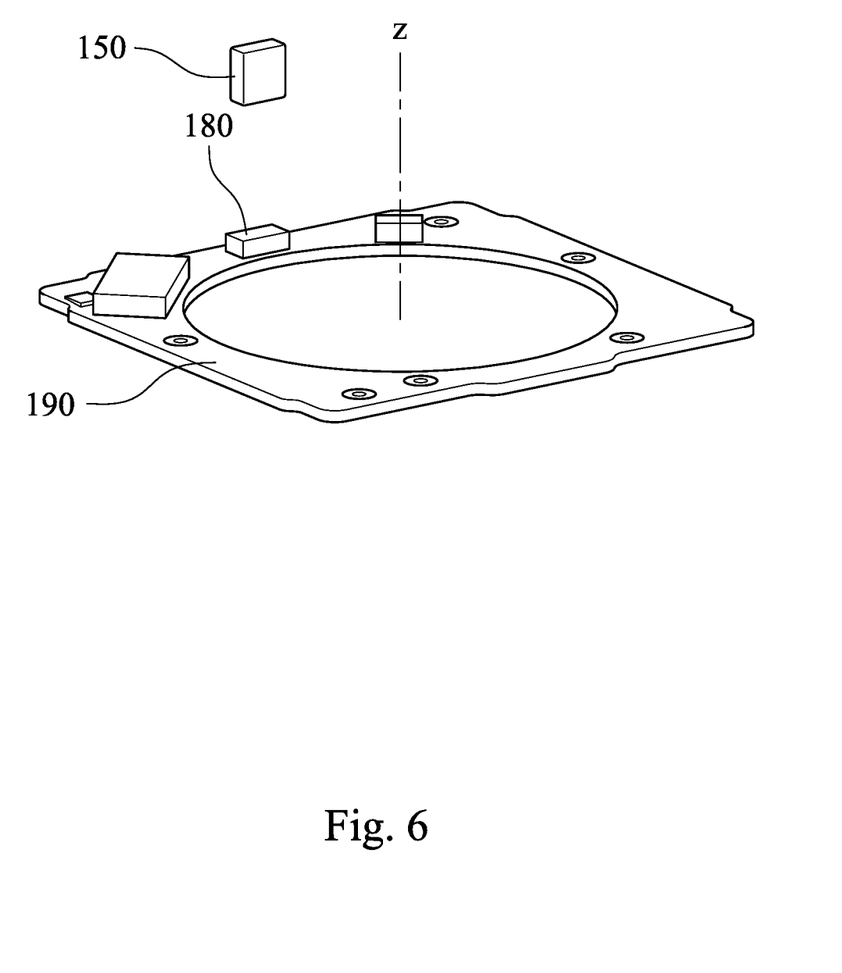
FIG. 6 is a schematic view of a detection magnet and a position detection unit according to FIG. 1.

FIG. 6 is a schematic view of the detection magnet 150 and the position detection unit 180 according to FIG. 1. In FIG. 1, FIG. 2, and FIG. 6, the detection magnet 150 and the position detection unit 180 may be arranged along the direction parallel to the central axis z. Therefore, it is favorable for effectively decreasing the parts quantity of the lens driving apparatus 100, and thereby reducing the assembling complexity of the lens driving apparatus 100.

In FIG. 2, the carrier 130 may include a notch portion 138 for accommodating the detection magnet 150, wherein an opening (its reference numeral is omitted) of the notch portion 138 faces the holder 170. Therefore, it is favorable for simplifying the production procedure of the lens driving apparatus 100 and preventing the assembling of the coil 140 from affecting the assembling stability of the detection magnet 150 on the carrier 130. Specifically, the detection magnet 150 can be disposed in the notch portion 138 by embedding, tightly fitting or glue dispensing.

The data of the aforementioned parameters of the lens driving apparatus 100 according to the 1st embodiment of the present disclosure are listed in the following Table 1, wherein the parameters are also shown as FIG. 4.

TABLE 1

| 1st Embodiment | | | |
|---|---|---|---|
| $\psi t$ (mm) | 6.52 | h (mm) | 0.2383 |
| $\psi c$ (mm) | 6.31 | | |

2nd Embodiment

Figure 7:
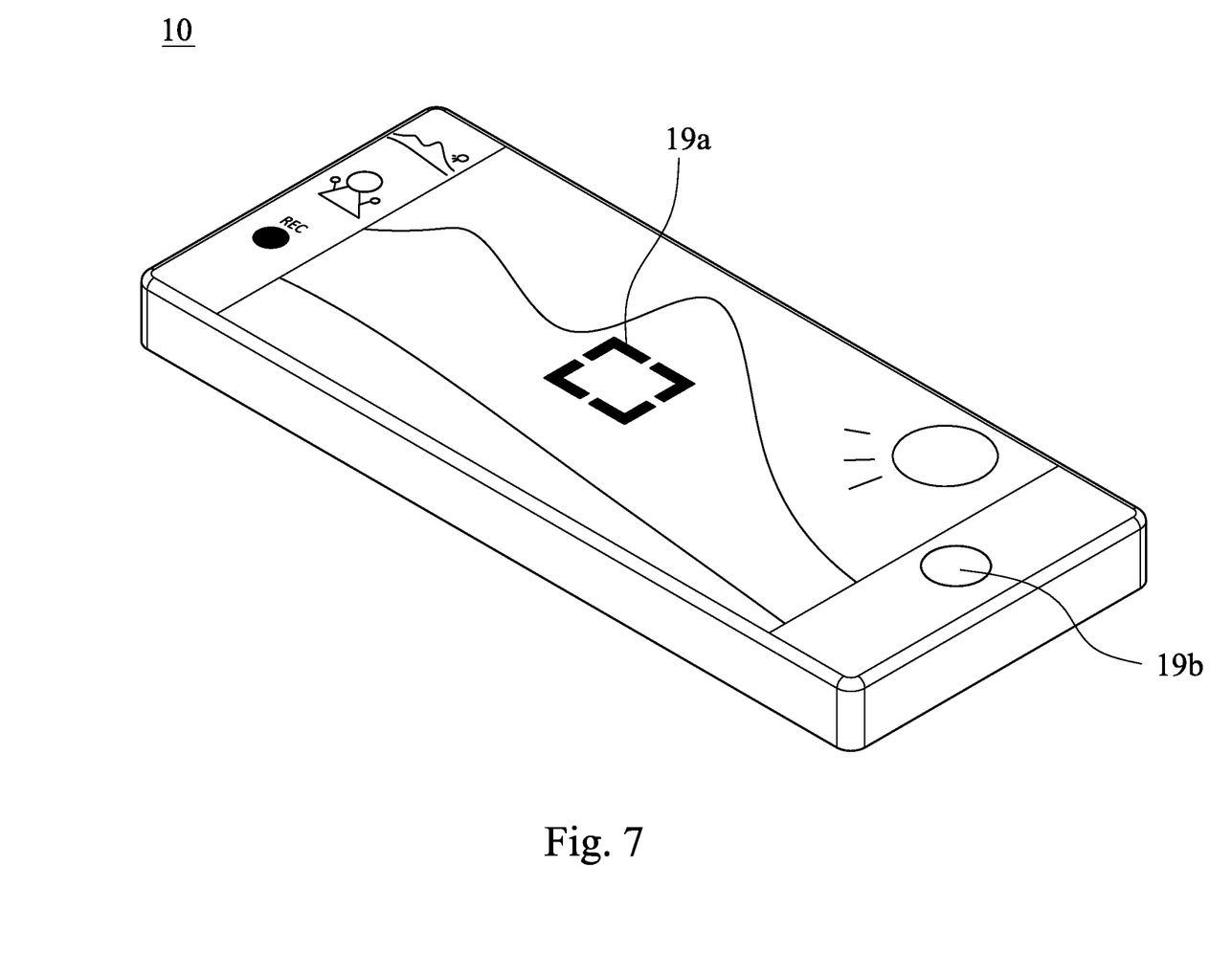
FIG. 7 shows a schematic view of an electronic device according to the 2nd embodiment of the present disclosure.
Figure 8:
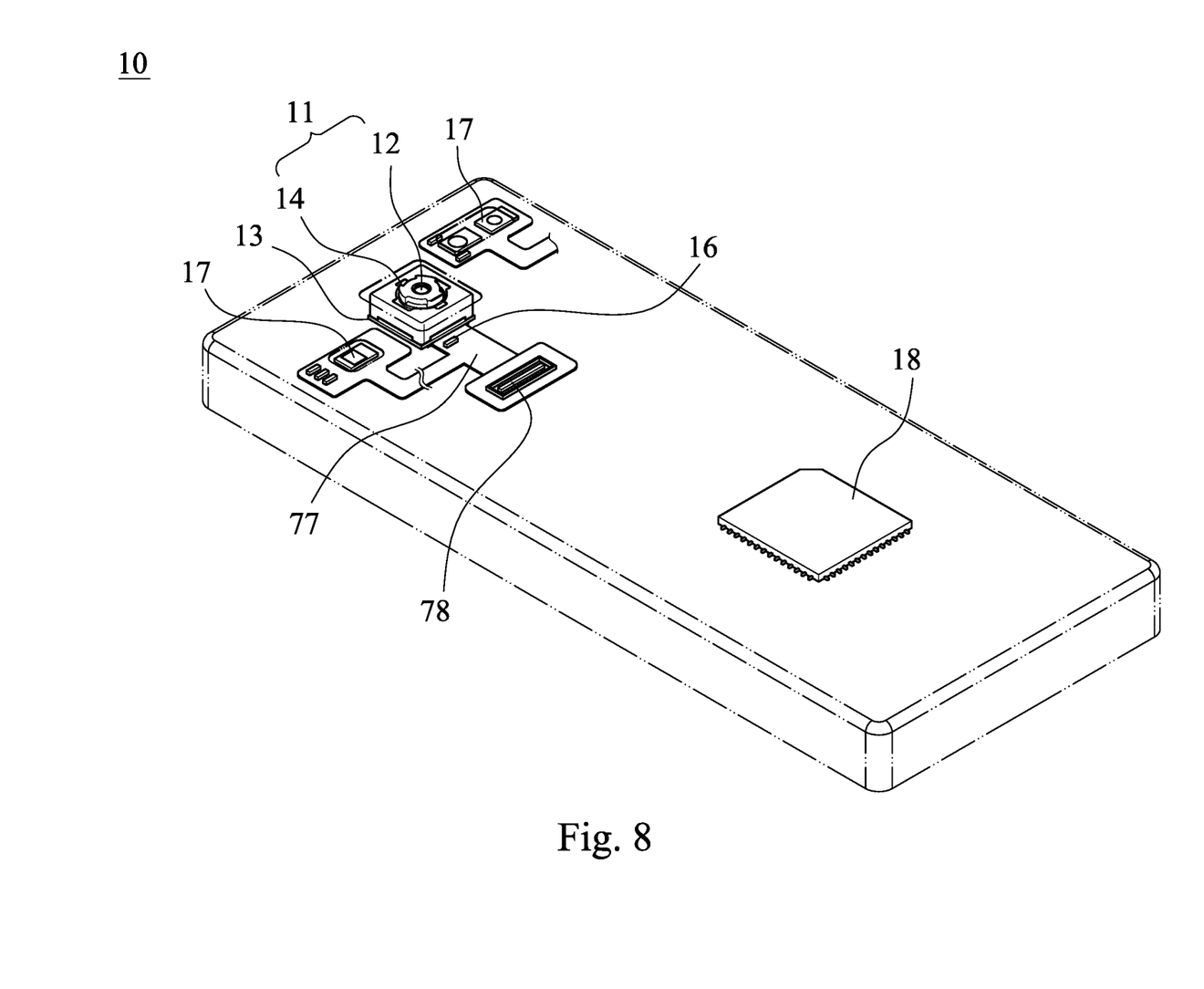
FIG. 8 shows another schematic view of the electronic device according to the 2nd embodiment.

FIG. 7 shows a schematic view of an electronic device 10 according to the 2nd embodiment of the present disclosure, FIG. 8 shows another schematic view of the electronic device 10 according to the 2nd embodiment, and particularly, FIG. 7 and FIG. 8 are schematic views related to a camera of the electronic device 10. In FIG. 7 and FIG. 8, the electronic device 10 of the 2nd embodiment is a smart phone, wherein the electronic device 10 includes a photographing module 11 and an image sensor 13. The photographing module 11 includes a lens driving apparatus 14 according to the present disclosure and a lens assembly 12, wherein the lens assembly 12 is assembled with a carrier (not shown herein) of the lens driving apparatus 14, and the image sensor 13 is disposed on an image surface (not shown herein) of the lens assembly 12 for receiving an imaging light from the lens assembly 12. Therefore, a better image quality can be achieved, and hence the high-end imaging requirements of modern electronic devices can be satisfied.

Moreover, the holder (not shown herein) of the lens driving apparatus 14 includes at least three first terminals and a plurality of second terminals. Each of the holder, the circuit board (not shown herein) of the lens driving apparatus 14 and a circuit board 77 carrying the image sensor 13 includes metal wires and terminals for externally electrically connecting. Accordingly, the circuit routing required by the lens driving apparatus 14 could be implemented by the electrical connection among the holder and the circuit board of the lens driving apparatus 100 and the circuit board 77.

Furthermore, the user activates the capturing mode via a user interface 19 of the electronic device 10, wherein the user interface 19 of the 2nd embodiment can be a touch screen 19a, a button 19b and etc. At this moment, the imaging light is converged on the image sensor 13 of the lens assembly 12, and the electronic signal associated with image is output to an image signal processor (ISP) 18.

Figure 9:
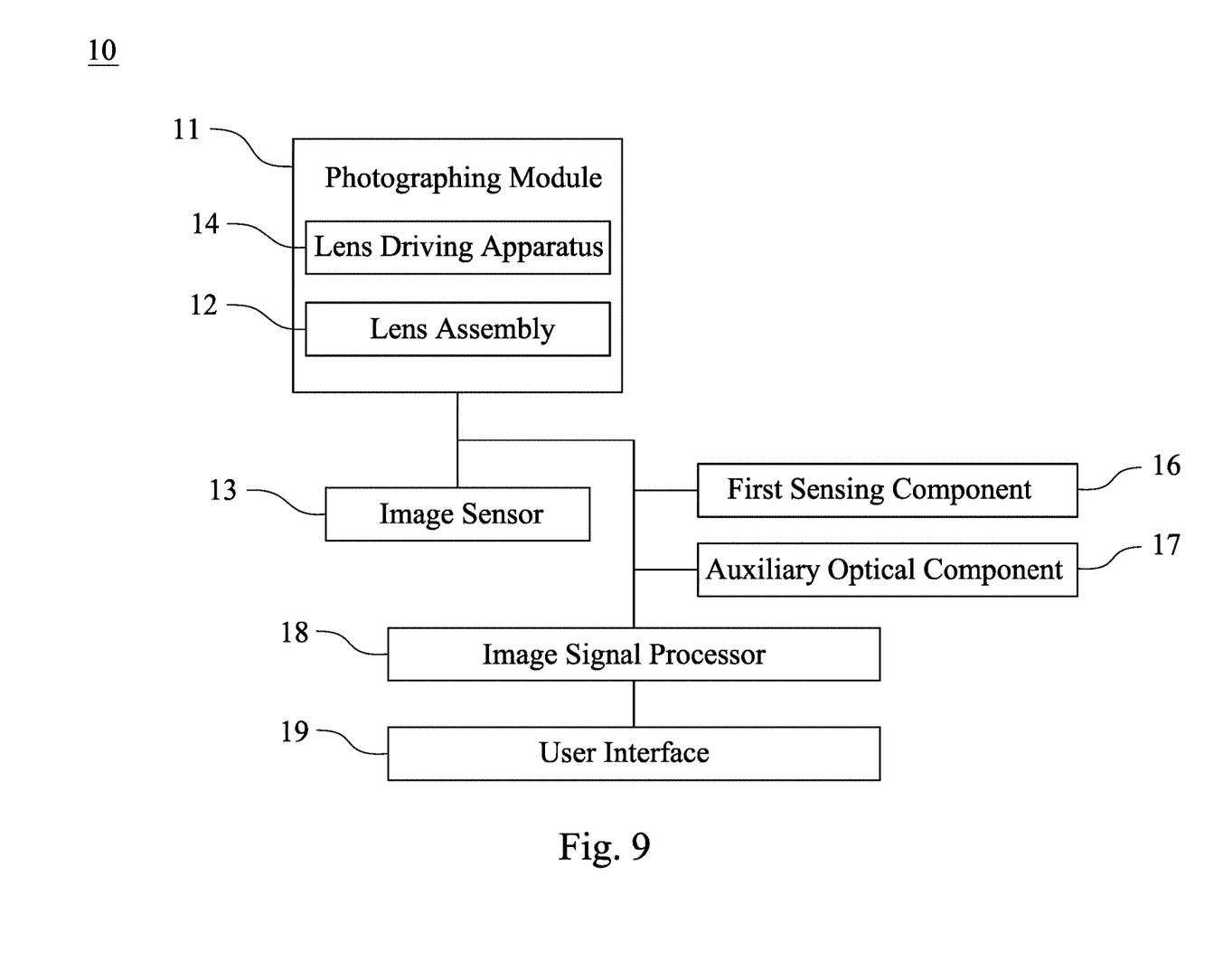
FIG. 9 shows a block diagram of the electronic device according to the 2nd embodiment.

FIG. 9 shows a block diagram of the electronic device 10 according to the 2nd embodiment, and in particular, the block diagram is related to the camera of the electronic device 10. In FIG. 7 to FIG. 9, the photographing module 11 can further include at least one auxiliary optical component 17 and at least one first sensing component 16. The auxiliary optical component 17 can be a flash module for compensating for the color temperature, an infrared distance measurement component, a laser focus module and etc. The first sensing component 16 can have functions for sensing physical momentum and kinetic energy, and thereby can be an accelerator, a gyroscope, and a Hall effect element, to sense shaking or jitters applied by hands of the user or external environments. Accordingly, the functions of the lens driving apparatus 14 of the photographing module 11 can be aided and enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 8, the photographing module 11, the first sensing component 16 and the auxiliary optical component 17 can be disposed on the circuit board 77 (the circuit board 77 is a flexible printed circuit board, FPC) and electrically connected with the associated components, such as the imaging signal processor 18, via a connector 78 to perform a capturing process. Since the current electronic devices, such as smart phones, have a tendency of being compact, the way of firstly disposing the photographing module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the photographing module can also be controlled more flexibly via the touch screen of the electronic device. In the 2nd embodiment, the electronic device 10 includes a plurality of first sensing components 16 and a plurality of auxiliary optical components 17. The first sensing components 16 and the auxiliary optical components 17 are disposed on the circuit board 77 and at least one other flexible printed circuit board (its reference numeral is omitted) and electrically connected with the associated components, such as the image signal processor 18, via corresponding connectors to perform the capturing process. In other embodiments (not shown herein), the first sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

3rd Embodiment

Figure 10:
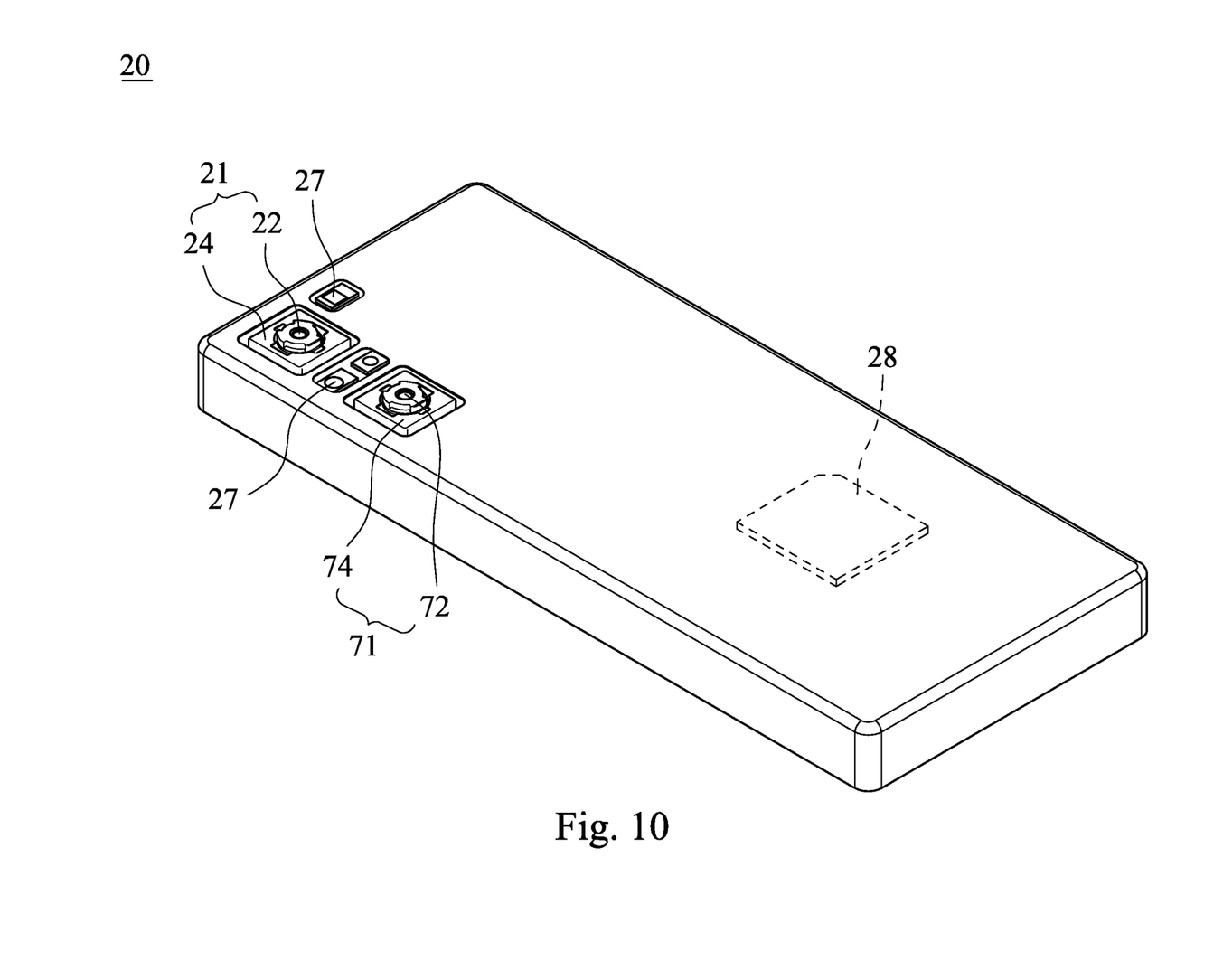
FIG. 10 shows an electronic device according to the 3rd embodiment of the present disclosure.

FIG. 10 shows an electronic device 20 according to the 3rd embodiment of the present disclosure. In FIG. 10, the electronic device 20 of the 3rd embodiment is a smart phone, wherein the electronic device 20 includes photographing modules 21, 71 and respectively corresponding image sensors (not shown herein). The photographing module 21 includes a lens driving apparatus 24 and a lens assembly 22, wherein the lens assembly 22 is assembled with a carrier (not shown herein) of the lens driving apparatus 24, and the image sensor is for receiving an imaging light from the lens assembly 22. The photographing module 71 includes a lens driving apparatus 74 and a lens assembly 72, wherein the lens assembly 72 is assembled with a carrier (not shown herein) of the lens driving apparatus 74, and the image sensor is for receiving an imaging light from the lens assembly 72.

Furthermore, at least one of the lens driving apparatuses 24 and 74 is a lens driving apparatus according to the present disclosure, and the lens driving apparatuses 24 and 74 may not have the same optical properties. In the photographing procedure of the electronic device 20, two images can be captured by the photographing modules 21 and 71 with an aid of an auxiliary optical component 27, and then the required effects like zooming, delicate images would be achieved by the processors (such as an image signal processor 28 and so on) equipped in the electronic device 20.

4th Embodiment

Figure 11:
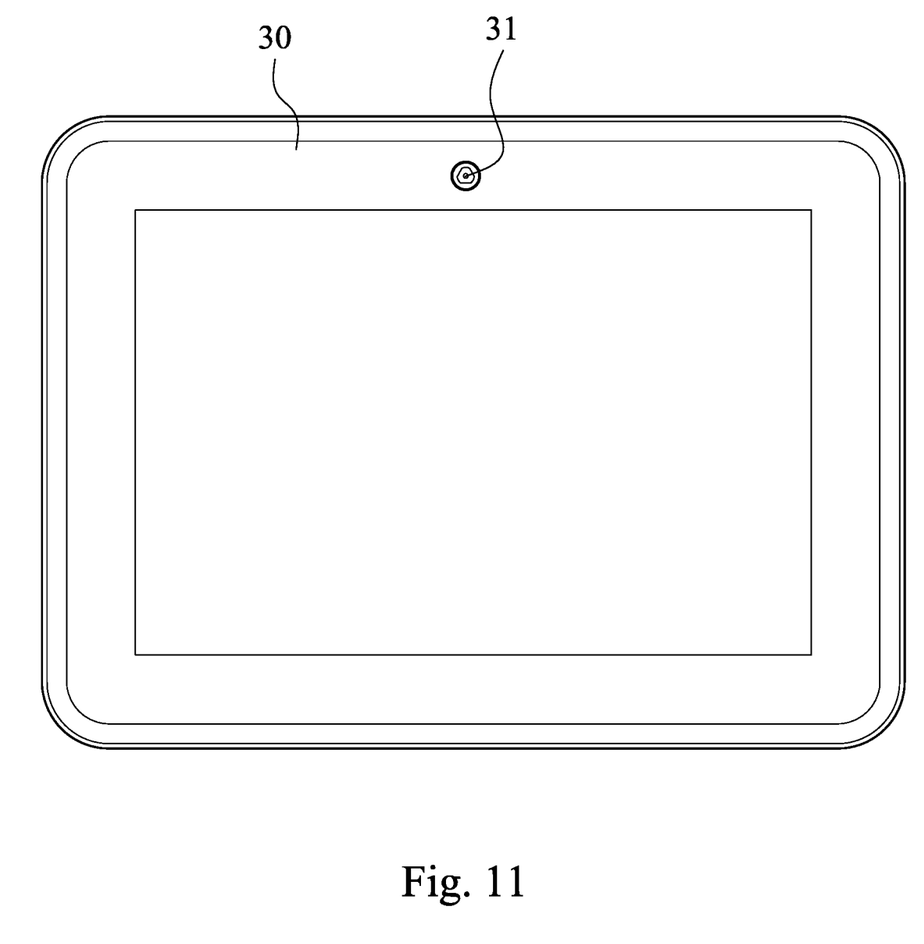
FIG. 11 shows an electronic device according to the 4th embodiment of the present disclosure.

FIG. 11 shows an electronic device 30 according to the 4th embodiment of the present disclosure. The electronic device 30 of the 4th embodiment is a tablet personal computer, wherein the electronic device 30 includes a photographing module 31 and an image sensor. The photographing module 31 includes a lens driving apparatus (not shown herein) according to the present disclosure and a lens assembly, wherein the lens assembly is assembled with a carrier of the lens driving apparatus, and the image sensor is for receiving an imaging light from the lens assembly.

5th Embodiment

Figure 12:
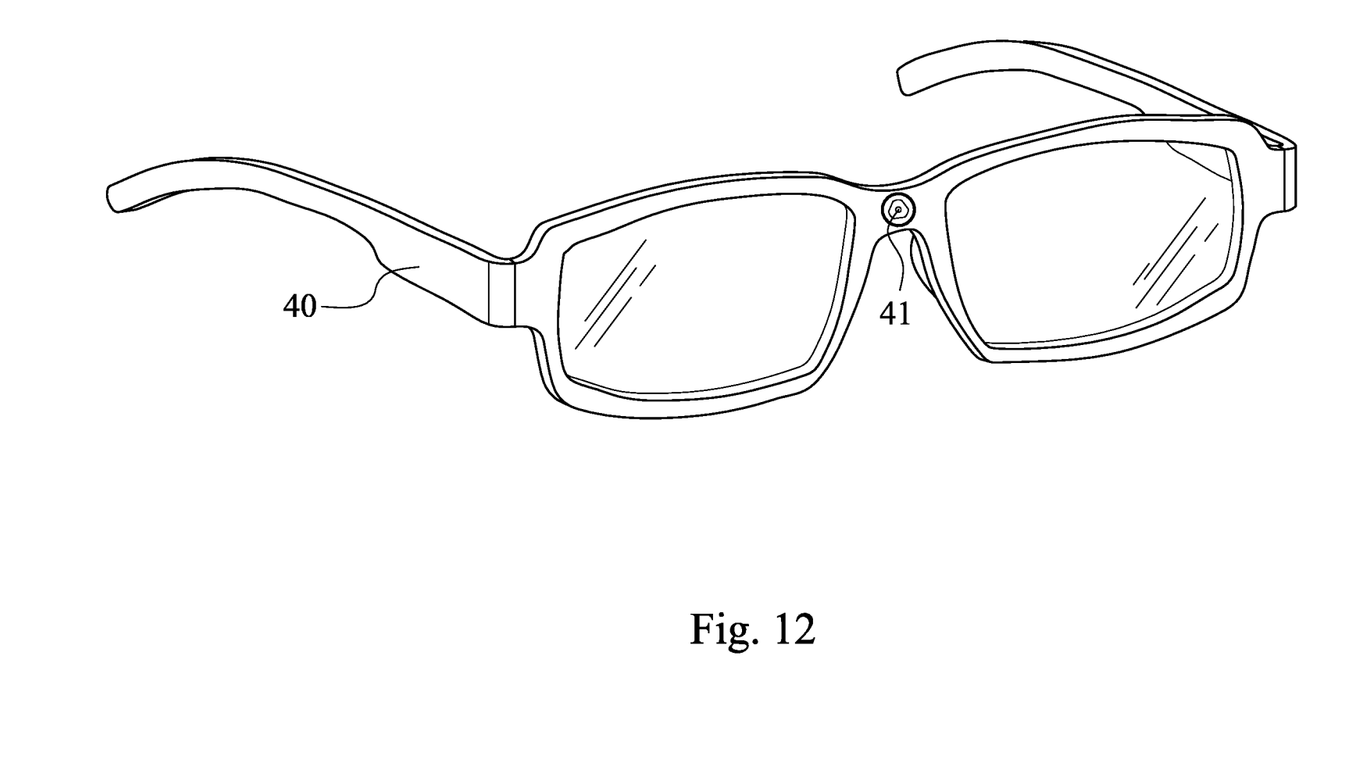
FIG. 12 shows an electronic device according to the 5th embodiment of the present disclosure.

FIG. 12 shows an electronic device 40 according to the 5th embodiment of the present disclosure. The electronic device 40 of the 5th embodiment is a wearable device, wherein the electronic device 40 includes a photographing module 41 and an image sensor. The photographing module 41 includes a lens driving apparatus (not shown herein) according to the present disclosure and a lens assembly, wherein the lens assembly is assembled with a carrier of the lens driving apparatus, and the image sensor is for receiving an imaging light from the lens assembly.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A lens driving apparatus, which is for driving a lens assembly, the lens driving apparatus comprising:
    a holder having a rectangular appearance, wherein the holder comprises a holder opening and four sides;
    a metal cover coupling to the holder and comprising a cover opening, which is disposed correspondingly to the holder opening;
    a carrier having a central axis, wherein the carrier is for being assembled with the lens assembly, the carrier is disposed in the metal cover, and the carrier is displaceable relative to the holder along a direction parallel to the central axis;
    at least one detection magnet coupling to an end of the carrier, wherein the end of the carrier is adjacently related to the holder;
    a circuit board comprising a circuit board opening, which is disposed correspondingly to the holder opening, wherein the central axis passes through both of the circuit board opening and the holder opening;
    a position detection unit disposed on the circuit board and correspondingly to the detection magnet, wherein the position detection unit is for detecting a displacement along the direction parallel to the central axis of the detection magnet, and the detection magnet and the position detection unit are respectively disposed on two sides of the holder and arranged relative to the direction parallel to the central axis;
    a coil wound around and disposed on an outer surface of the carrier; and
    at least three driving magnets disposed in the metal cover and correspondingly to the coil;
    wherein the holder further comprises:
    at least three first terminals positioned adjacently related to the four sides of the holder and extended outward from the holder along the direction parallel to the central axis, wherein the position detection unit is positioned adjacently related to the four sides; and
    a plurality of second terminals fixedly connected to the circuit board;
    wherein the position detection unit is positioned adjacently related to one of the four sides, the three first terminals are positioned adjacently related to another one of the four sides, and the side that the position detection unit is positioned is different from the side that the three first terminals are positioned.

2. The lens driving apparatus of claim 1, wherein the carrier comprises a notch portion for accommodating the detection magnet, and an opening of the notch portion faces toward the holder.

3. The lens driving apparatus of claim 1, wherein the first terminals are embedded in the holder by an insert molding method.

4. The lens driving apparatus of claim 1, further comprising:
    at least one upper leaf spring; and
    at least one lower leaf spring, wherein the upper leaf spring and the lower leaf spring are both connected to the carrier and arranged relative to the central axis, the lower leaf spring is disposed on the end of the carrier adjacently related to the holder, the lower leaf spring comprises a terminal connecting section, and the terminal connecting section is electrically connected to a metal joint of the holder.

5. The lens driving apparatus of claim 1, wherein the metal cover further comprises an upper end wall and at least three side walls, the upper end wall surrounds the cover opening, the side walls are connected to the upper end wall and extended from the upper end wall toward the holder, the side walls are respectively corresponding to at least three of the four sides of the holder, the side walls are connected to form at least two corners, at least two of the driving magnets are respectively received in the corners, and a central portion of each of the side walls is not in contact with the driving magnets.

6. The lens driving apparatus of claim 5, wherein a diameter of the circuit board opening is ψt, a diameter of the holder opening is ψc, and the following condition is satisfied:

ψt>ψc.

7. The lens driving apparatus of claim 6, wherein the circuit board is located adjacent to an end of the holder, and the end of the holder is adjacently related to the metal cover.

8. The lens driving apparatus of claim 1, wherein the circuit board further comprises a plurality of conductive joints, and the second terminals of the holder are welded to the conductive joints.

9. The lens driving apparatus of claim 8, wherein at least two of the conductive joints are disposed adjacent to the circuit board opening.

10. The lens driving apparatus of claim 1, wherein the circuit board is rectangular and corresponding to the rectangular appearance of the holder.

11. The lens driving apparatus of claim 1, wherein each of the first terminals is gold-plated.

12. A photographing module, comprising:
    the lens driving apparatus of claim 1; and
    the lens assembly assembled with the carrier of the lens driving apparatus.

13. An electronic device, comprising:
    the photographing module of claim 12; and
    an image sensor for receiving an imaging light from the lens assembly.

14. The lens driving apparatus of claim 1, wherein a thickness of the position detection unit is h, and the following condition is satisfied:

h<1.0 mm.

* * * * *